US012269048B2

(12) United States Patent
Van Rijn et al.

(10) Patent No.: US 12,269,048 B2
(45) Date of Patent: Apr. 8, 2025

(54) SPRAY DEVICE FOR GENERATING A MICRO-JET SPRAY

(71) Applicant: MEDSPRAY B.V., Enschede (NL)

(72) Inventors: Cornelis Johannes Maria Van Rijn, Amsterdam (NL); Wietze Nijdam, Enschede (NL); Wilhelmus Petrus Johannes De Kruijf, Enschede (NL); Henri Joseph Van Egmond, Enschede (NL)

(73) Assignee: MEDSPRAY B.V., Enschede (NL)

( * ) Notice: Subject to any disclaimer, the term of this patent is extended or adjusted under 35 U.S.C. 154(b) by 161 days.

(21) Appl. No.: 17/055,214

(22) PCT Filed: May 16, 2019

(86) PCT No.: PCT/NL2019/050285

§ 371 (c)(1),
(2) Date: Nov. 13, 2020

(87) PCT Pub. No.: WO2019/221603

PCT Pub. Date: Nov. 21, 2019

(65) Prior Publication Data

US 2021/0268523 A1 Sep. 2, 2021

(30) Foreign Application Priority Data

May 16, 2018 (EP) .................................... 18172755

(51) Int. Cl.
*B05B 1/10* (2006.01)

(52) U.S. Cl.
CPC .................................... *B05B 1/10* (2013.01)

(58) Field of Classification Search
CPC .............. B05B 1/10; B05B 1/26; B05B 1/267
See application file for complete search history.

(56) References Cited

U.S. PATENT DOCUMENTS

2006/0103691 A1* 5/2006 Dietl ...................... B41J 2/2125 347/40
2008/0248182 A1* 10/2008 Jongsma ............ B01D 67/0034 428/305.5

(Continued)

FOREIGN PATENT DOCUMENTS

EP 2390010 A1 11/2011
WO WO-02090762 A1 11/2002

(Continued)

OTHER PUBLICATIONS

Nasr G.G. et al., Background on Sprays and Their Production. In: Industrial Sprays and Atomization. 2002 Springer, London. https://doi.org/10.1007/978-1-4471-3816-7_2.

*Primary Examiner* — Steven M Cernoch
(74) *Attorney, Agent, or Firm* — Perry + Currier Inc.

(57) ABSTRACT

The present invention provides a spray device that generates a fluidic micro-jet spray and that allows and retains a relatively narrow droplet size distribution, of micro-jets and droplets obtained via the Rayleigh breakup mechanism, under a well-defined control of coalescence. To tint end a spray device is characterized in that a spray nozzle unit is formed by a nozzle body (1), comprising a support body (2) with at least one cavity (3) spanned by a membrane layer (4) having a nozzle orifice throughout a thickness of said membrane layer at an area of said cavity (3) in fluid communication with that cavity (3). The nozzle orifice may be part of a first relatively dense group of first orifices (5*a*) or of a less dense second group of second nozzle orifices (5*b*) in the membrane layer. A mean diameter of the nozzle orifices (5*a*) located in the first group substantially differs from the mean diameter of the nozzle orifices (5*b*) in the second group to obtain a uniform droplet size distribution in the spray.

18 Claims, 8 Drawing Sheets

(56) References Cited

U.S. PATENT DOCUMENTS

| | | | | |
|---|---|---|---|---|
| 2012/0021896 | A1 * | 1/2012 | Nakano | B05C 7/02 502/100 |
| 2017/0136481 | A1 | 5/2017 | Fritz et al. | |

FOREIGN PATENT DOCUMENTS

| | | | |
|---|---|---|---|
| WO | WO-2017095227 | A1 | 6/2017 |
| WO | WO-2018100321 | A1 | 6/2018 |
| WO | WO-2019106319 | A1 | 6/2019 |
| WO | WO-2019106323 | A1 | 6/2019 |

* cited by examiner

SPRAY DEVICE FOR GENERATING A MICRO-JET SPRAY

The present invention relates to a spray device for generating a micro jet spray, comprising a spray nozzle unit having at least one spray nozzle body, wherein said spray nozzle body comprises at least one cavity for receiving a pressurized fluid and a number of orifices that during operation receive said pressurized fluid and release a ray of consecutive droplets to said external environment, each of said at least one cavity being bounded by a membrane layer that separates said cavity from an external environment and that comprises at least one of said number of orifices in fluid communication with said cavity, extending throughout a thickness of said membrane layer, wherein said number of orifices comprises a group of first orifices of substantially identical first size that release rays of droplets in a first region of said micro jet spray, and wherein said number of orifices comprises a group of second orifices of substantially identical second size that release rays of droplets in a second region of said micro jet spray.

A micro-jet spray may emanate from many emitting jets, in which each jet will initially breakup into a mono disperse primary droplet train according to the so-called Rayleigh breakup mechanism. As a result, consecutive primary droplets have a same size and propagate from the nozzle orifice in a same direction, typically the diameter of the primary droplet is 1.85-2.0 times the diameter of the nozzle orifice.

Often the corresponding nozzle orifices are provided in a planar substrate yielding jets all directed in a same spraying direction. When spray nozzle units are further miniaturized the distance between nozzle orifices will become smaller and micro-jets propagating in a parallel fashion may easily exhibit disordered trajectories due to local under-pressure caused by co-flowing air streams induced by the micro-jets, leading to undesirable coalescence of jets and droplets, resulting in a broadened droplet size distribution. Complex mechanisms such as charging, ultrasound and heating may be used to manipulate and deflect individual liquid jets and corresponding droplet trains. Also, a forced co-flow of air via additional nozzle(s) has been proposed to prevent coalescence of parallel liquid jets. Providing nozzle orifices in a curved planar or convex deformable substrate yielding jets directed in a different spraying direction may also be used to control the amount of jet coalescence.

European patent application EP 2,390,010 discloses a spray device in which coalescence of neighbouring spray jets is counteracted by a reduced density of the nozzle orifices in a central region of the membrane layer as compared to a more peripheral region. This, however, likewise reduces the total flow rate and therefor the efficiency and/or usability of the spray device in this central portion of the spray head.

A spray device of the type as described in the opening paragraph is for instance known from US patent application 2008/0006719. This patent application describes, particularly with reference to FIG. 7 of its drawing, a spray nozzle body with a support body and front wall that are formed as a single piece of plastic material. The front wall of this known device is relatively thin and elastically deformable for adopting an overall curved profile once exposed to the pressure of said pressurized fluid yielding jets directed in different spraying directions.

For specific applications such as cosmetics, perfume, wafer cleaning, fuel injection, spray dryers, medical sprays, characteristic spray patterns are required and adequate control of the droplet size distribution of the generated spray is required. For pharmaceutical applications, for instance, a spray providing small droplets with a narrow size distribution can be efficiently targeted at different sections of the lungs, provided that the micro-jet spray can be adequately controlled and reproduced. To that end the prior art device is required to have orifices that are mutually approximately of a same size, at least differing less than 20% of one another. In practice, however, it turns out that this requirement is in itself not adequate under all circumstances to realize an appropriately narrow droplet size distribution.

The present invention has inter alia for its object to provide a spray device capable of creating a substantially uniform spray pattern with droplets of approximately a same size, or at least within a very narrow size distribution. The present invention particularly aims, inter alia, to provide a spray device that generates a uniform micro-jet spray that retains a relatively narrow droplet size distribution, of micro-jets and droplets obtained via the Rayleigh breakup mechanism, under a well-defined control of coalescence.

In order to achieve said object a spray device as described in the opening paragraph, according to the invention, is characterized in that a ray density of said first region is higher than a ray density of said second region, in that said first size of said first orifices is smaller than said second size of said second orifices, and in that said first and said second orifices generate droplets of substantially a same size in said first region and said second region respectively.

Particularly, the first orifices release droplets in a central region of said micro jet spray and said second orifices release droplets in a peripheral region of said micro jet spray outside said central section, said peripheral region at least partly surrounding said central region of said micro jet spray.

The invention thereby departs from the teachings of said prior art device and is based on the recognition that particular measures to control coalescence of individual jets and droplets are of major importance for preventing a widening of the droplet size distribution, especially in these special spray devices. In particular coalescence of individual Rayleigh jets and droplets within droplet trains appears a major contribution to final droplet size and droplet size distribution when jets have a diameter smaller than 20 micrometre and primary droplets are smaller than 40 micrometre. If an inter-distance between neighbouring nozzle orifices becomes smaller than 200 micrometre then corresponding micro-jets and droplet trains will exhibit disordered trajectories due to local under-pressure caused by co-flowing air streams induced by the micro-jets, leading to undesirable coalescence of jets and droplets, resulting in a broadened droplet size distribution. A specific embodiment of the spray device according to the invention is, hence, characterized in that an average mutual distance (pitch) between said first group orifices is smaller than 200 micron, particularly smaller that 50 micron, and in that an average mutual distance between said second orifices is larger that said average mutual distance between said first orifices.

This effect is pre-dominant for the orifices within the first group of orifices that generate rays packed relatively closely together to form said central region of said spray with a high ray density. These dense rays are more prone to inter-coalescence and therefor their droplets tend to grow during their trajectory form their source to their target. This is effect is compensated at least to a certain extent in the second group of orifices that will create a less dense (peripheral) region of the spray pattern by choosing their size to be larger on the average than that of the first group of orifices. The droplets emanating from these second orifices are, hence, already larger from their very outset to meet up with the ultimate size of the droplets emanating from the first orifices. A specific embodiment of the spray device according to the invention is, accordingly, characterized in that said first orifices populate a central region of said membrane layer, and in that said second orifices populate a peripheral region of said membrane layer that at least partly surrounds said central region.

Normally nozzle orifices up to several micrometre in diameter are being provided in a thin membrane layer on top of a nozzle body from a material such as silicon, glass, metals and their alloys, ceramics and polymers with a typical thickness between 25 and 250 micrometre. According to the invention it has been found advantageous to reduce the flow resistance of the nozzle orifices as much as possible by thinning down the membrane layer to below 2 micrometre. The strength of such a membrane layer can be increased considerably by having a nozzle body with a local cavity that is spanned by the membrane layer, at least one nozzle orifice being provided throughout a thickness of the membrane layer at the location of said cavity.

Surprisingly it has been found that when the thickness of the membrane layer is less than 2 micrometre a much more uniform spray can be obtained due to the reduction in the required operating pressure during the start and the evolution of the spray process. When a moderate operating pressure is applied also a build-up of the spray including all micro-jets will be moderate, uniform and smooth due to the reduced flow resistance of the nozzle orifices.

A specific embodiment of the spray device according to the invention is characterized in that said first and second orifices have a substantially circular cross section, a mean diameter of said second orifices within said second group of orifices being at least 10% larger than a mean diameter of said first orifices within said first group of orifices, particularly being between 20% and 40% larger. The mean diameter is defined as the square root of 4 times the cross section divided by pi.

It has been found that for spray nozzle units in which an inter-distance between neighbouring cavities is less than 500 micrometre, and/or that an inter-distance between neighbouring orifices is less than 200 micron a more uniform spray with a narrower droplet size distribution may be obtained, provided that a diameter of nozzle orifices responsible for the first region of the spray differs more than 10%, and preferably between 20% and 40% relative to the nozzle diameter second nozzle orifices that are responsible for the more peripheral region in the spray pattern. Further, it appears advantageous that the first (central) region is populated by at least 20-80% and the second (peripheral) region by at least 80-20% of all nozzle orifices present in the membrane layer.

It is an insight of this invention that micro-jets in the first (central) region suffer more from coalescence than those in the more peripheral second region of the spray pattern. The more coalescence of primary droplets the larger the resulting secondary droplet size will become. Typically, micro-jet sprays generated with a plurality of nozzle orifices all having a similar diameter will still feature mean droplet sizes between 3-4 times the nozzle diameter, whereas according to pure Rayleigh breakup a mean droplet size of maximum 2 times the nozzle diameter would be expected. A secondary droplet size of 3 times the nozzle diameter implies that about 3-4 primary droplets have formed the secondary droplet, whereas a secondary droplet size of 4 times the nozzle diameter implies that about 8-12 primary droplets have formed the secondary droplet.

It has been observed that primary droplets originating from micro-jets in the centre of the spray suffer typically 2-4 more times from coalescence occurrences than primary droplets from micro-jets originating from the periphery of the spray. To compensate for this, it has been found advantageous to have the diameters of the orifices that create the central region of the spray being at least 20-40% smaller than the nozzle orifices that are responsible for the more outside, peripheral part of the spray pattern. This way, the final droplet size after coalescence may be fine-tuned to render a more mono disperse final spray having a small droplet size distribution parameter. Specifically, a further embodiment of the spray device according to the invention is characterized in that the droplets that are generated by said first orifices have a first average size, in that the droplets that are generated by said second orifices have a second average size that deviates less than 10% of said first average size.

Normally the droplet size distribution may be characterized in terms of volume as DVX, with X % being the total volume of liquid sprayed drops with a specific diameter expressed in micrometres (μm) smaller than DVX, and 100−X % of droplets with a larger diameter than DVX. A DV10 of 8 micron means that 10% of the spray volume has droplets with a diameter smaller than 8 microns. DV50 is also defined as the Volume Mean Diameter. The droplet size distribution can also be characterized by the Relative Span (RS) as RS=(DV90−DV10)/DV50. The Relative Span has been found significantly smaller when the diameter of nozzle orifices that generate the centre of the spray is at least 10% smaller than the nozzle diameter of nozzle orifices that create the periphery of the spray, especially when the inter-distance between neighbouring orifices is less than 200 microns.

A specific embodiment of the device according to the invention is characterized in that said group of first orifices forms a central group of first orifices, and in that said group of second orifices forms a peripheral group of second orifices, said peripheral group at least partly surrounding said central group. In this manner the orifices are distributed over the nozzle body according to their role in the eventual spray pattern, i.e. the first orifices in a central portion of the nozzle body for generating the central region of the spray pattern and the second orifices in a more peripheral portion of the nozzle body for generating the peripheral region in the eventual spray pattern.

Typically, the nozzle orifices have a diameter of several tens of a micron to several microns and the thickness of the membrane layer is preferably less than 2 microns. The Relative Span values have been found significantly smaller when a mean of the nozzle orifice diameter in the central group differs at least 10% but not more than 40% with respect to a mean of the diameter of nozzle orifices located in the peripheral group. And with preference a mean of the nozzle orifice diameter in the central group differs between 20% and 40% with respect to a mean of the diameter of nozzle orifices located in the peripheral group.

In another embodiment of the invention spray nozzles have been constructed with a centre group and a peripheral group of spray orifices in such a way that the central group forms a narrow-angled cone and the peripheral group forms a concentric wider angled hollow cone. To that end a specific embodiment of the device according to the invention is characterized in that said peripheral region of said micro jet spray has an angle of inclination with respect to said membrane layer and particularly forms substantially a cone surrounding said central region of said micro jet spray. With preference the membrane layer spanning the cavities comprises first and second orifices that are designed to emit jets with varying angles with respect to the perpendicular direction of the membrane layer. In specific embodiments for eye care, skin, perfume sprays, etc. it is important that the impacting spray is homogeneously and uniformly distributed over the targeted area. This is achieved by varying the density and/or size of the nozzle orifices in the membrane layer of the central group with respect to the more peripheral group of orifices. A smaller nozzle diameter will result in a jet creating smaller droplets, therewith lowering the amount of liquid that is being sprayed by the central group. Likewise, larger nozzle diameters in the peripheral group will result in increasing the amount of liquid that is being sprayed, and this is advantageous because jets in the peripheral groups may emit under a larger diverging angle with respect to the perpendicular direction of the membrane layer, leading to a less dense non-uniform spray. With this measure the impacting spray is more uniformly distributed over the targeted area.

Also, the density of nozzle orifices in the peripheral group can be increased to obtain a more uniformly distribution of liquid over the targeted spray area. In practise a design considering a variation in the nozzle diameters and density of nozzle orifices in each specific centred or more peripheral groups will be needed to obtain an impacting spray that is sufficiently uniformly distributed over the targeted area. In summary, also in this case it has been found that varying the orifice size of the centre group compared to the peripheral group will give a more uniform spray pattern and surface impact of the groups of jets.

Surprisingly it has also been observed that, when slightly increasing or decreasing the orifice size of a central group of nozzles compared to a peripheral group of orifices, the resulting spray is built up in a more controlled way and more spread in time, yielding groups of micro-jets that start to emit one group after another group, the centre group earlier than the peripheral group. Also, the initial wetting of the membrane layer is more spread in time, herewith lowering the total pressure impact of the priming fluid when it arrives at the membrane layers. Herewith a more shock resistant nozzle geometry is obtained.

In several cases a substantial further reduction of the Relative Span parameter RS with at least 20-40% has been measured. It has been found advantageous that at least 10% of all nozzle diameters in the central group is at least 10% smaller than the mean nozzle diameter in the peripheral group, and preferably between 20-40% smaller. A nozzle having a diameter that is 10% smaller will contribute about 20% less jet fluid per jet to the total spray which is reasonable. A nozzle having a diameter that is 10% smaller will have an increased minimum spray pressure that is about 10% higher, which is also reasonable.

Substantially smaller orifices (e.g. more than 10% difference) start spraying at a substantially higher operating pressure. Most pump systems for pressurizing the liquid do not have a perfect square wave shaped pressure profile with a steep ramp-up, but a slower pressure build up at the start of pumping. This has the effect that where the larger orifices already start spraying, the smaller orifices are leaking liquid without forming a Rayleigh droplet train. When designing a spray nozzle system with a peripheral group of orifices with a larger diameter than the central group of orifices, this may cause a non-uniform spray at the start and end of the pump stroke.

To overcome this issue, a special embodiment of the device according to the invention is characterized in that a second orifice is an assembly of a primary orifice adjacent at least one secondary orifice, said primary orifice having substantially a same diameter as said mean diameter of said first orifices within said first group of orifices and said at least one secondary orifice have a smaller diameter than said primary orifice. These secondary orifices are in a way satellite orifices to the primary orifice within such an assembly. The fluid oozing through the satellite nozzle orifices will nevertheless be combined with the jet fluid of the adjacent larger primary nozzle orifice, giving rise to a thicker jet and corresponding larger spray droplets.

Particularly, said at least one secondary orifice has less than half a size of said primary orifice, particularly less than 20% of said size of said primary orifice, and said at least one secondary orifice is part of a group of secondary orifices surrounding said primary orifice. In this way a centre group of orifices can be combined with a peripheral group of orifices, in which the peripheral group of orifices consists of such assemblies having primary orifices of substantially a same size as the central orifices and each peripheral orifice having a number, e.g. 4, smaller satellite orifices, yielding thicker jets emitting from the peripheral group of orifices than from the central group of orifices.

To control the coalescence and to yield a uniform initial spray in a gentle manner it has been found advantageous to tune the size of each cavity with the size and number of nozzles in the membrane layer. When initially priming the spray nozzle unit with the fluid from a pressurized chamber the air inside the spray nozzle unit will escape through the nozzles orifices in the membrane layer with a large velocity and the fluid will then create a rather high and not very well controlled water shock wave on the membrane layer, herewith possibly creating neighbouring jets with initially uncontrolled jet velocities and uncontrolled coalescence effects. To reduce such uncontrolled high velocity of the air escaping through the nozzles it has been found advantageous to reduce substantially these high air velocities through the nozzles by increasing a flow resistance of the corresponding cavity. With preference the flow resistance of each cavity is between 0.1 and 10% of the flow resistance of all nozzles present in each membrane layer above each cavity. When initially priming the spray nozzle unit with the liquid from a pressurized chamber the fluid will first pass the cavity before it arrives at the membrane layer. When the liquid arrives at the cavity the flow resistance of the cavity increases with the ratio between the liquid flow resistance and the airflow resistance of the cavity. This ratio is depending amongst others on the viscosity ratio between the liquid and the air and is typically a factor 100-1000. If the (air) flow resistance of each cavity is between 0.1 and 10% of the (air) flow resistance of all nozzles present in the membrane layer above the cavity a significant reduction in the air speed through the nozzles is realized at the moment that the liquid enters the corresponding cavity. Correspondingly, the pressure impact of the priming fluid, when it arrives at the membrane layer with a substantially smaller velocity, is significantly lowered.

This pressure impact can be further reduced by the presence of remaining air pockets close to the membrane layer when the liquid reaches the nozzle orifice(s). These air pockets can be designed by introduction of appropriate dead-end spaces connected to the membrane layer and/or the cavity. For example, dead-end air pockets can be obtained by surrounding each cavity with a membrane with at least one spray orifice by multiple cavities spanned by the membrane layer void of any orifices. These dead-end air pocket in such a space will act as a spring and a cushion and diminishes the initial pressure burst of the liquid when it impacts the membrane layer. The combination of dead-end air pockets and membrane orifices can be engineered to form a well-balanced spring damper system.

In a special embodiment such dead-end air pockets can be obtained by the presence of cavities with membrane layers that have one or more air cushion nozzle orifices with a very small diameter, substantially smaller than the nozzle orifices used for emitting the jets. With preference the diameter of such an air cushion nozzle orifice is at least 50% smaller than the mean diameter of the nozzle orifices. The high flow resistance of such a small orifice will allow the existence of the air pocket for a sufficient time to cushion the pressure burst when priming the spray nozzle unit. Also, the small orifice will allow controlled refilling of the air pocket with air before re-priming takes place due to evaporation through the open connection between the outside world and the cavity. The number of such air pocket cavities will depend on the amount of cushioning needed, and with preference these air pocket cavities or dead-end spaces are distributed homogenously between the cavities supporting the membrane layers with nozzle orifices used for emitting the jets.

Further advantageous embodiments of the device according to the invention will become apparent from the following description with reference to a few drawings and figures. It should, however, be noticed that the figures are drawn schematically and not to scale. In particular, certain dimensions may be exaggerated to a higher or lesser extent in order to improve the overall clarity. Corresponding parts are denoted by a same reference sign throughout the drawings.

DESCRIPTION OF THE DRAWINGS

In FIG. 6 the diameter of neighbouring cavities is alternatingly changing from small to large (3*b*, 3*a*) herewith retarding the start of the jets coming from the larger cavities herewith enabling the built up of the total jet spray with a reduced coalescence.

In FIG. 7 three nozzle body cavities (3*a*) with two neighbouring air pocket cavities (3*b*) are depicted. The diameter of the nozzle orifice (5*a*) in the membrane layer is here 10 micrometre, whereas the diameter of the air pocket orifice (5*b*) in the membrane layer is 2 micrometre. The ratio in flow resistance between the thin orifices (10 and 2) is here at least a factor 125 herewith significantly reducing the velocity of the liquid in the air pocket cavities with respect to the velocity in the nozzle cavities. This configuration enables a more gradual built up of the total jet spray with a controlled coalescence and with a total pressure impact of the priming liquid that is cushioned by the air pocket.

FIG. 9 shows two plots of the size distribution; the dashed line depicts the results obtained with orifices having all an equal orifice diameter of 2.25 micron. The Relative Span value RS=(DV90-DV10)/DV50 is here larger than 1. The second plot (solid line) is obtained with 20 orifices having an orifice diameter of 1.8 micron in the centre and 20 orifices with an orifice diameter of 2.5 micron in the periphery of the group. The RS here is 0.4. The inter-orifice distance is here 100 microns.

FIG. 10 shows two plots of the size distribution; the dashed line depicts the results obtained with orifices having all an equal orifice diameter of 7 micron. The RS is here larger than 1. The second plot (solid line) is obtained with 10 orifices having an orifice diameter of 5.5 micron in the centre and 10 orifices with 8.5-micron diameters in the periphery of the group. The RS is here 0.4. The inter-orifice distance is here 150 microns.

Figure 1:
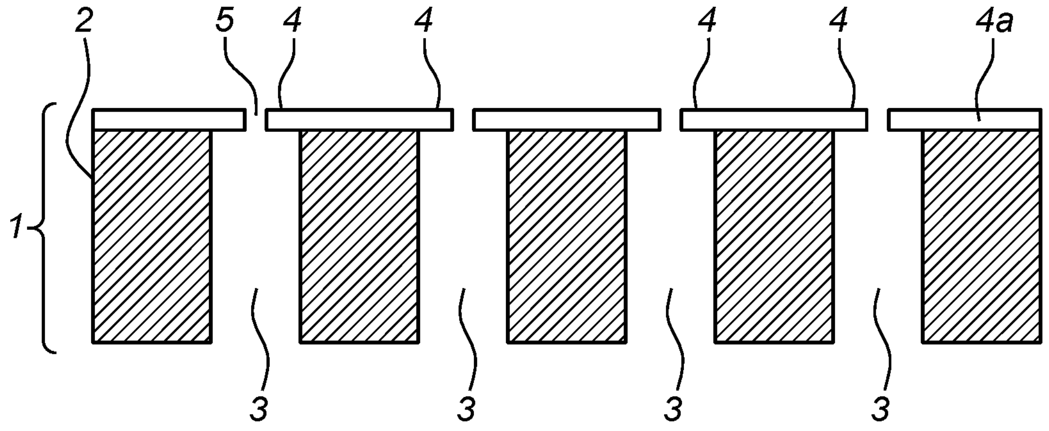
In FIG. 1 a cross section is shown of the spray nozzle unit having a nozzle body (1), comprising a mono crystalline silicon support body (2) with a thickness of 200 micrometre and a number of cavities (3) typically with a diameter of 30-100 micrometre, said support body (2) being covered by a membrane layer (4*a*) of silicon nitride forming a number of membrane layers (4) spanning the cavities (3) with a typical thickness between 0.5 and 1.5 micrometre provided with a number of nozzle orifices (5) throughout a thickness of the membrane layer (3), typically with a diameter between 2 and 20 micrometre. In this example the orifice diameter is 10 micron the cavity diameter is 40 microns and the inter-distance between neighbouring orifices is 100 microns.
Figure 2:
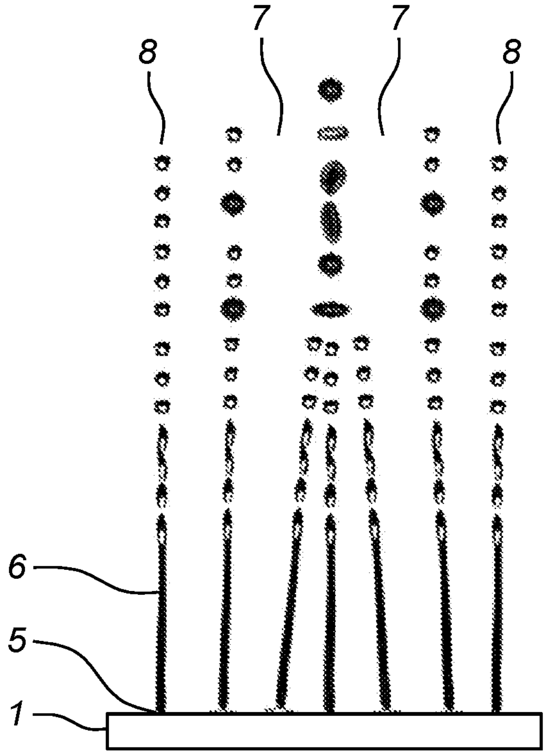
In FIG. 2 the spray behaviour of the spray nozzle is depicted. Rayleigh jets (6) are being emitted through the nozzle orifices (5) of the flat nozzle body (1). Jets originating from the central group (7) of nozzle orifices (5) in the membrane layer suffer more from coalescence than jets originating from the peripheral group (8).
Figure 3:
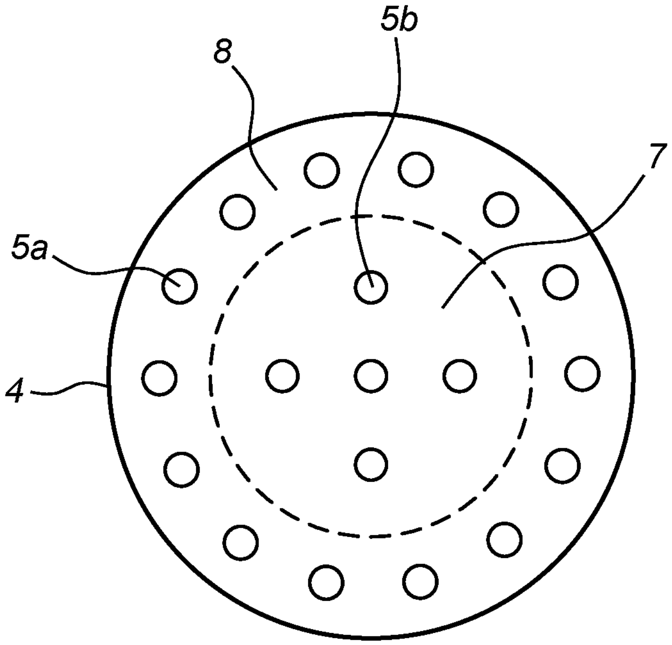
In FIG. 3 the top view of a spray nozzle with a single membrane layer (4) is depicted having a number of nozzle orifices (5*a*) with a diameter of 4 micron distributed inside a peripheral group (8) and nozzle orifices (5*b*) with a diameter of 7 micron distributed inside a central group (7).
Figure 4:
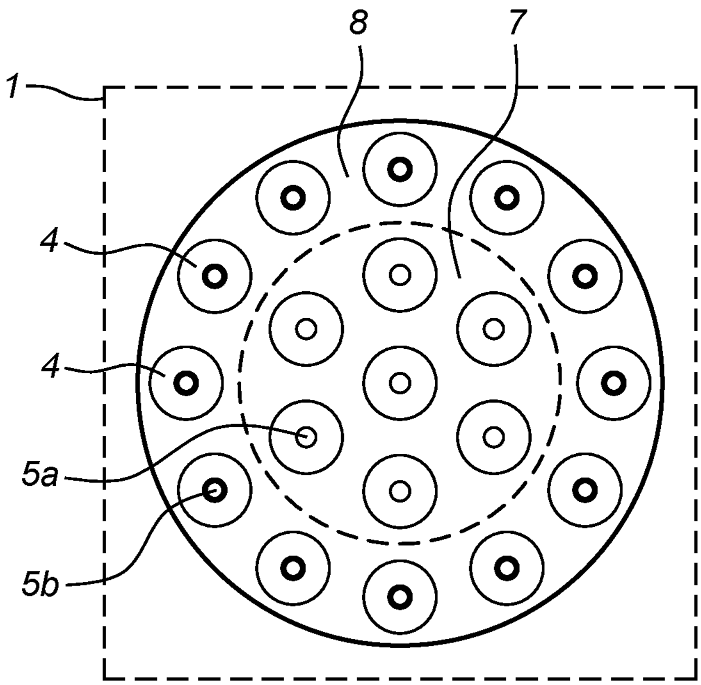
In FIG. 4 the top view of a spray nozzle with a number of membrane layers (4) is depicted each having a single nozzle orifice (5). The diameter of the nozzle orifices (5*a*) present in the central group (7) are preferentially chosen smaller (e.g. 2.0 micrometre) than the diameter (e.g. 3.0 micrometre) of the nozzle orifices (5*b*) present in the peripheral group (8). Herewith the resulting coalescence of the droplet and jets can be controlled in such a way that a more monodisperse final spray can be obtained.
Figure 5:
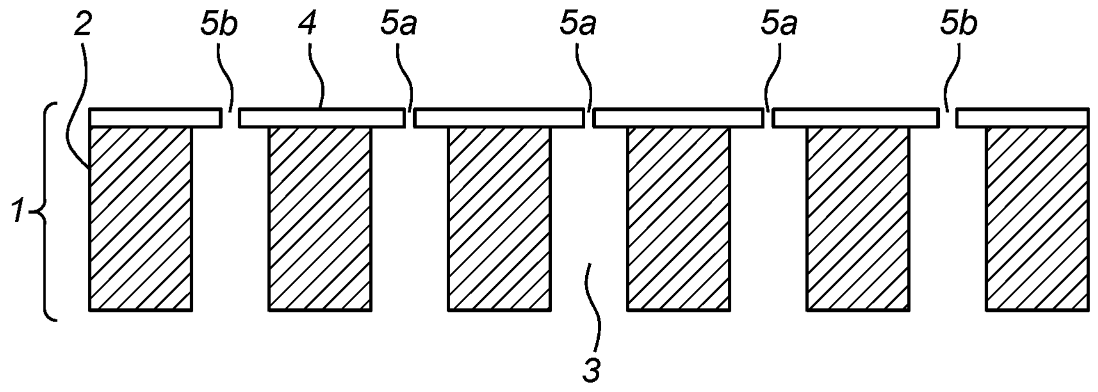
In FIG. 5 a cross section of a spray nozzle body having a number of different membrane layers (4) and orifices (5) is depicted. The diameter of the nozzle orifices (5*a*) present in the central group are smaller than the diameter in the peripheral group. Herewith the resulting coalescence of the droplet and jets can be controlled in such a way that a more monodisperse final spray can be obtained.
Figure 6:
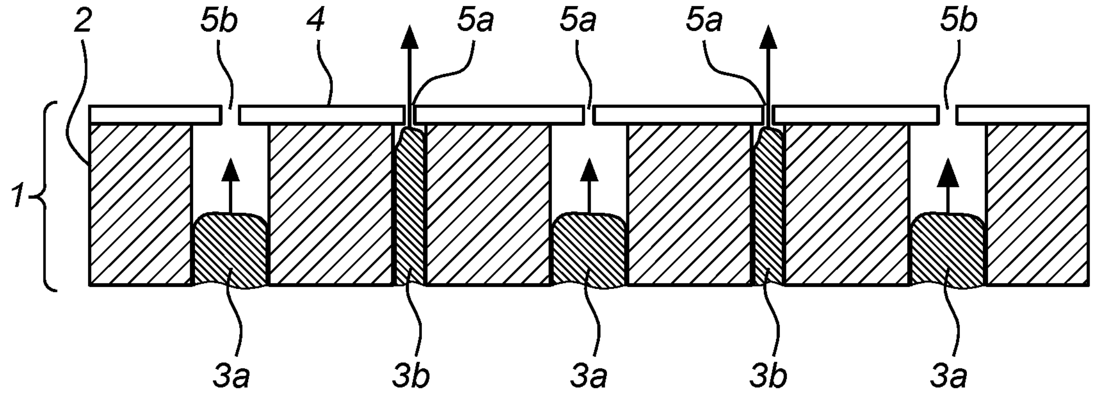
FIGS. 6 and 7 depict preferred embodiments are depicted by which the control of the coalescence and the gradual built up of the emitting jets can be further optimized by adjusting the nozzle diameters and/or diameter of the nozzle cavities and air pocket cavities or dead-end spaces.
Figure 7:
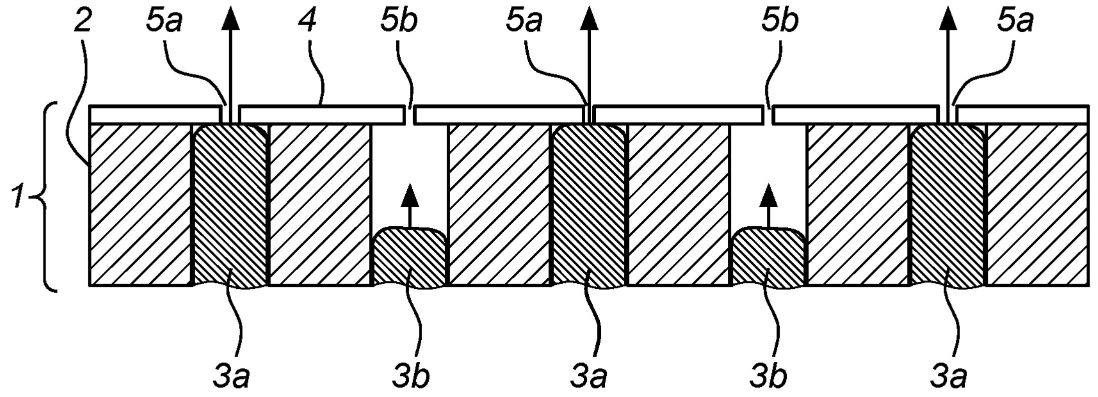
Figure 8:
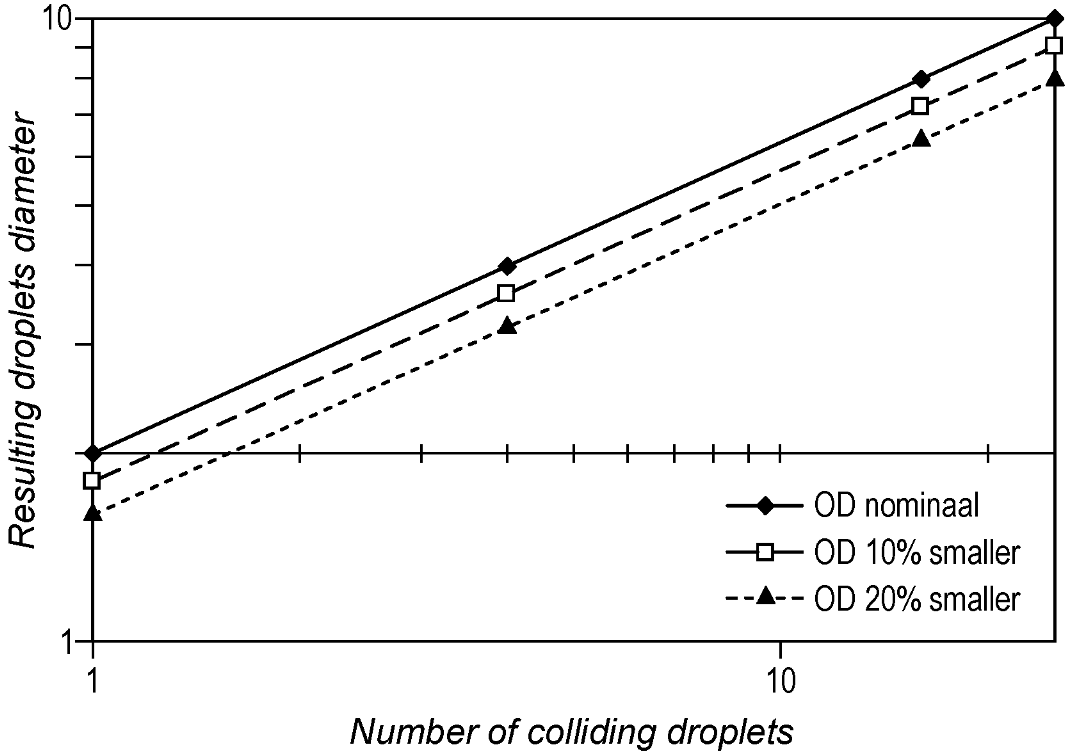
In FIG. 8 a graph is depicted showing the relation between the resulting droplet size and the number of colliding primary droplets. If a 10% or even 20% smaller than the nominal orifice or primary droplet size is chosen, many more droplets will have to collide to obtain the same resulting droplet size as for the nominal orifice size.
Figure 9:
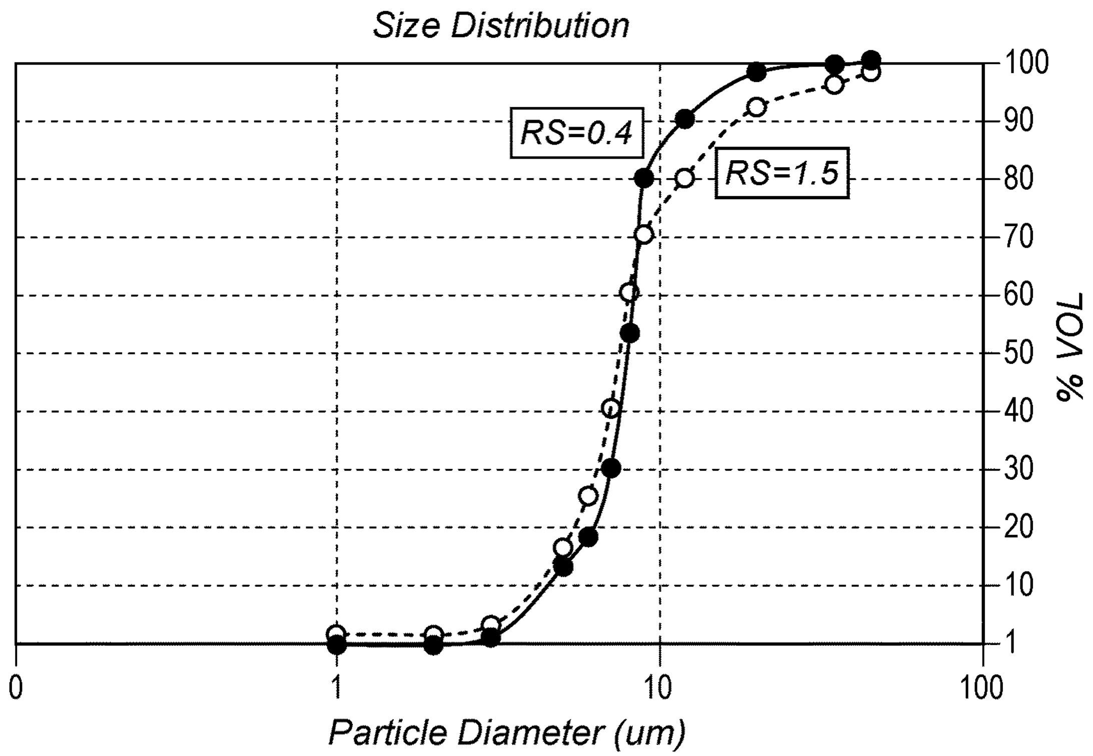
FIGS. 9 and 10 show two graphs with droplet size distribution plots obtained with small and large nozzle orifices.
Figure 10:
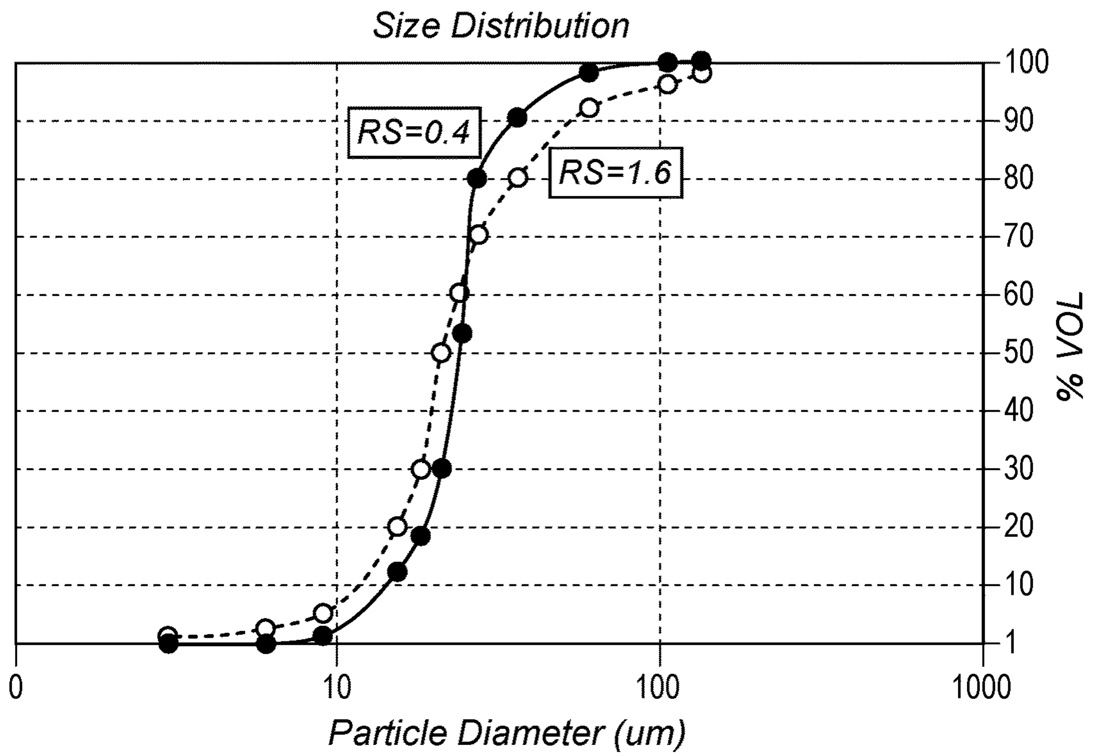
Figure 11:
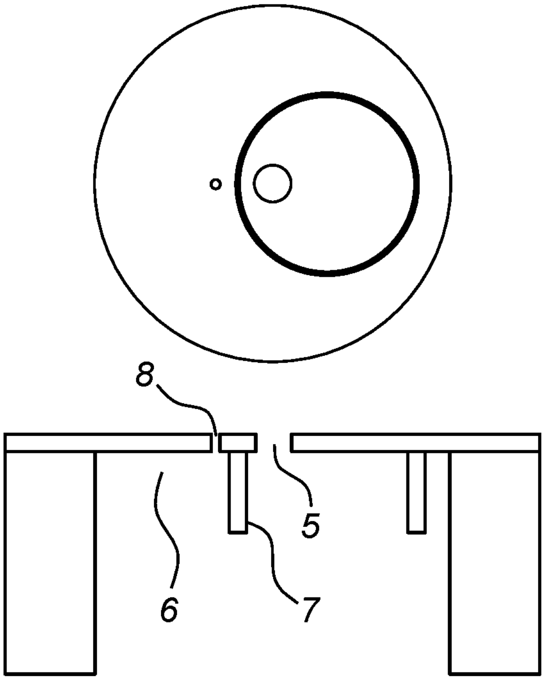
In FIG. 11 a side and top view of a nozzle is shown having a centred nozzle orifice (5) and an offset air cushion chamber (6) with a region of the wall (7) preferably near the nozzle orifice to deflect the emitting jet. In the air cushion chamber a small air cushion orifice (8) is present to slowly fill the air cushion chamber with liquid. For strength reasons it may be advantageous to centre the air cushion chamber over the membrane instead of the nozzle orifice.
Figure 12:
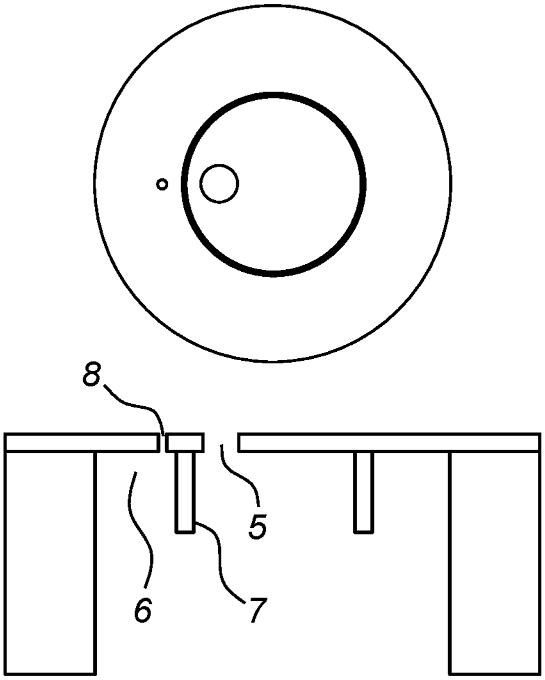
In FIG. 12 a side and top view of a nozzle is shown having a centred air cushion chamber (6) with a nozzle orifice (5) placed preferably near the wall (7) of the air cushion chamber to deflect the emitting jet. In the air cushion chamber a small orifice (8) is present to slowly fill the air cushion chamber with liquid. The wall (7) of the air cushion chamber is preferably made from the same material the membrane layer (3). Preferably no transition in material is present on the surface between the wall and the membrane layer.
Figure 13:
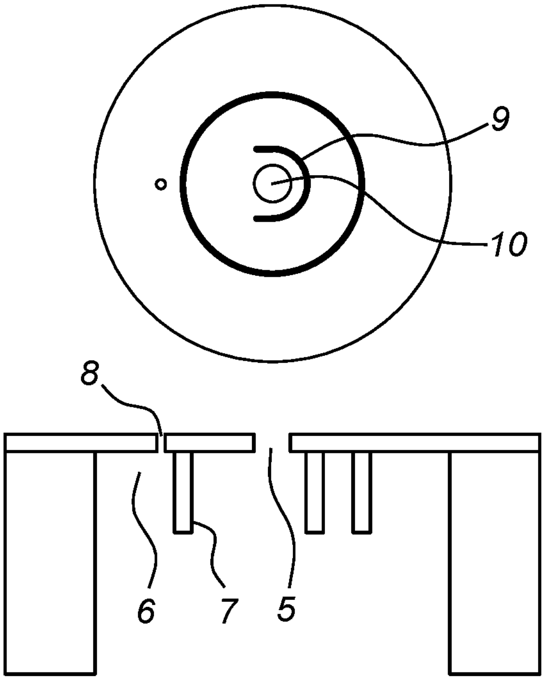
FIG. 13 shows another embodiment of the invention where both the nozzle orifice (10) and the air cushion chamber (6) are centred on the membrane. A small orifice (8) is present to allow controlled air release and air filling for water hammer pressure damping after re-priming. If a jet deflection is needed to control the impact of the jet a barrier (9) may be present around the nozzle orifice (10). The wall (6) of the air cushion chamber and the wall of the barrier (9) are preferably made from silicon nitride. Preferably no transition in material is present on the surface between the walls and the membrane layer. Barrier walls and air cushion chambers can very well be made with silicon machining techniques and made from ceramic materials like silicon, silicon oxide, silicon nitride, silicon carbide and the like. Besides ceramics, other materials like metals or plastics may be used as well.
Figure 14:
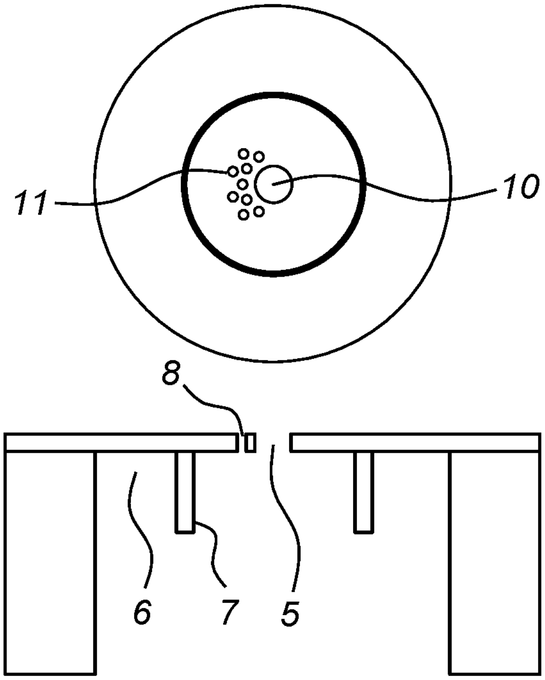
In FIG. 14 yet another embodiment of the present invention is shown with a preferably centred air cushion chamber (6) and preferably centred nozzle orifice (5,10). Next to the nozzle orifice several satellite orifices (11) is placed to obtain a larger emitting jet from the nozzle orifice but having the same start pressure as a membrane with a nozzle orifice of the same diameter without the satellite orifices. In some cases, the air cushion chamber has no orifice and filling the pocket with air must be accommodated via the nozzle orifice.
Figure 15:
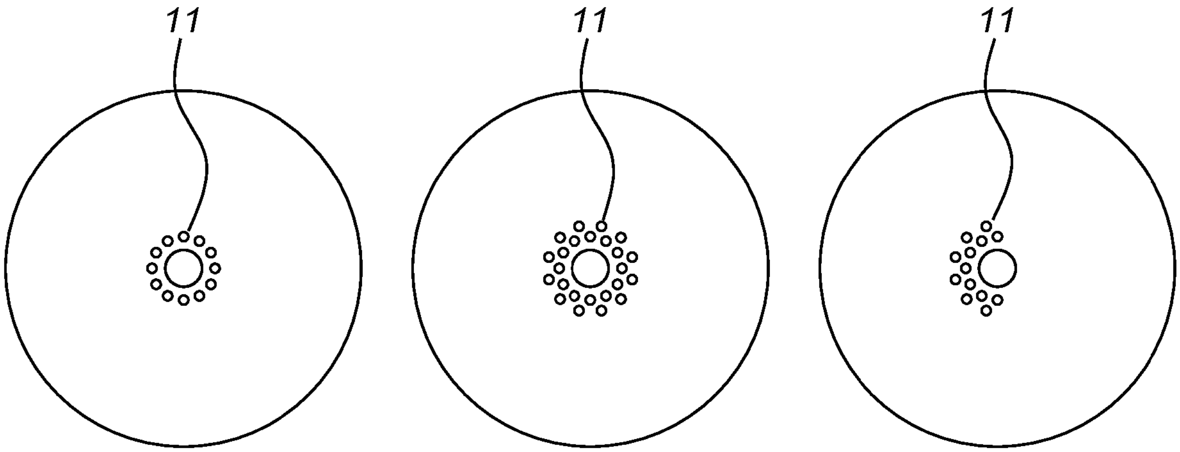
In FIG. 15 a schematic overview is given of three membrane layers having different lay-outs for the satellite orifices around a central orifice. During spraying, the satellite orifices will ooze liquid. This liquid will be taken up by the jet emitting from the nozzle orifice and thicken the jet, yielding larger droplet. When the nozzle orifice is accompanied by satellite orifices which are placed asymmetrical around the nozzle orifice a significant deflection the jet can be observed.

It will be clear that the present invention is by no means limited to the embodiments of the figures. Particularly many different geometries are likewise possible for choosing the nozzle orifice size and diameter of the cavities in the nozzle body for many specific reasons. Many more alternative embodiments and variations are feasible for a skilled person without requiring him to exercise any inventive skill or to depart from the true nature and spirit of the present invention as emanating from the following claims.

The invention claimed is:

1. A spray device for generating, during operation, a micro jet spray consisting of spray droplets, the spray device comprising a spray nozzle unit having at least one spray nozzle body, wherein said spray nozzle body is covered by a membrane layer, wherein said at least one spray nozzle body comprises at least one cavity for receiving, during operation, a pressurized fluid and a number of orifices that during operation receive said pressurized fluid and release, during operation, concurrent rays of consecutive droplets to said external environment, each of said at least one cavity being bounded by said membrane layer that separates said cavity from an external environment and that comprises at least one of said number of orifices in fluid communication with said cavity extending throughout a thickness of said membrane layer, wherein said number of orifices comprises a group of first orifices of substantially identical first size that release, during operation, concurrent rays of droplets in a first region of said micro jet spray, and wherein said number of orifices comprises a group of second orifices of substantially identical second size that release, during operation, concurrent rays of droplets in a second region of said micro jet spray, characterized in that a ray density of said first region is higher than a ray density of said second region, in that said first size of said first orifices is smaller than said second size of said second orifices, and in that, during operation, droplets in said micro jet spray emanating from said first orifices of said first region have substantially a same size as droplets emanating from second orifices of said second region.

2. The spray device according to claim 1, wherein said first orifices populate a central region of said membrane layer, and in that said second orifices populate a peripheral region of said membrane layer that at least partly surrounds said central region.

3. A spray device according to claim 1 wherein an average mutual distance (pitch) between said first group orifices is smaller than 200 micron, particularly smaller that 50 micron, and in that an average mutual distance between said second orifices is larger that said average mutual distance between said first orifices.

4. A spray device according to claim 1, wherein the droplets that are generated by said first orifices have a first average size, and wherein the droplets that are generated by said second orifices have a second average size that deviates less than 10% of said first average size.

5. The spray device according to claim 1, wherein said first and second orifices have a substantially circular cross section, an average diameter of said second orifices being at least 10% larger than an average diameter of said first orifices.

6. A spray device according to claim 2, wherein said peripheral region of said micro jet spray has an angle of inclination with respect to said membrane layer and particularly forms substantially a cone surrounding said central region of said micro jet spray.

7. The spray device according to claim 1, wherein the first orifices comprises 20-80% and the second orifices comprises 80-20% of said number of nozzle orifices in said membrane layer.

8. The spray device according to claim 1, wherein said membrane layer comprises a silicon nitride layer with a thickness less than 2 micrometre.

9. The spray device according to claim 1, wherein said nozzle body comprises silicon, and wherein first and second orifices are substantially circular having a diameter between 1 and 20 microns.

10. A spray device according to claim 1, wherein said second orifices are each an assembly of a primary orifice adjacent at least one secondary orifice, said primary orifice having substantially a same size as said first size of said first orifices and said at least one secondary orifice having a smaller size than said primary orifice.

11. A spray device according to claim 10, wherein said at least one secondary orifice has less than half a size of said primary orifice, particularly less than 20% of said size of said primary orifice.

12. A spray device according to claim 10, wherein said at least one secondary orifice is part of a group of secondary orifices surrounding said primary orifice.

13. The spray device according to claim 1, wherein said spray nozzle body comprises at number of cavities for receiving said pressurized fluid, and in that an inter-distance between neighbouring cavities is less than 500 micrometre.

14. A spray device according to claim 13, wherein the diameters of neighbouring cavities alternately change from small to large.

15. A spray device according to claim 13, herein said first orifices populate a central region of said membrane layer, and wherein said second orifices populate a peripheral region of said membrane layer that at least partly surrounds said central region, and wherein the diameters of neighbouring cavities gradually changes from large in the peripheral group to small in the central group.

16. A spray device according to claim 1, wherein a flow resistance of a cavity is between 0.1% and 10% of a flow resistance of said at least one orifice that is present in the membrane layer bounding said cavity.

17. The spray device according to claim 1, wherein said first and second orifices have a substantially circular cross section, an average diameter of said second orifices being at between 20% and 40% larger than an average diameter of said first orifices.

18. A method for generating a microjet spray consisting of spray droplets, said method comprising:

providing a spray device, comprising a spray nozzle unit with at least one spray nozzle body that comprises at least one cavity, wherein said spray nozzle body is covered by a membrane layer that separates said at least one cavity from an external environment and comprises a number of orifices extending throughout a thickness of said membrane layer, in fluid communication with said at least one cavity to receive a pressurized fluid and to release concurrent rays of consecutive droplets of said pressurized fluid to said external environment;

supplying said pressurized fluid to said at least one cavity;

releasing rays of consecutive droplets of said pressurized fluid by a group of first orifices of substantially identical first size in a first region of said micro jet spray; and concurrently releasing rays of consecutive droplets of said pressurized fluid by a group of second orifices of substantially identical second size in a second region of said of said micro jet spray;

wherein a ray density within said first region is higher than a ray density within said second region;

wherein said first size of said first orifices is smaller than said second size of said second orifices;

wherein said first orifices and said second orifices concurrently generate droplets in said first region and in said second region respectively, and wherein spray droplets emanating from said first orifices of said first region have substantially a same size as spray droplets emanating from said second orifices of said second region.

* * * * *